United States Patent
Hawsey et al.

[11] Patent Number: 5,117,141
[45] Date of Patent: May 26, 1992

[54] DISC ROTORS WITH PERMANENT MAGNETS FOR BRUSHLESS DC MOTOR

[75] Inventors: Robert A. Hawsey, Oak Ridge; J. Milton Bailey, Knoxville, both of Tenn.

[73] Assignee: The United States of America as represented by Department of Energy, Washington, D.C.

[21] Appl. No.: 559,030

[22] Filed: Jul. 30, 1990

[51] Int. Cl.⁵ .................. H02K 16/00; B63H 5/10
[52] U.S. Cl. ..................... 310/114; 310/156; 310/268; 440/6
[58] Field of Search ............ 310/46, 114, 268, 80, 310/156; 440/6

[56] References Cited

U.S. PATENT DOCUMENTS

| | | | |
|---|---|---|---|
| 3,334,254 | 8/1967 | Kober | 310/268 |
| 3,418,506 | 12/1968 | Parker | 310/268 |
| 3,823,919 | 7/1974 | Benedikter | |
| 4,121,668 | 10/1978 | Miner | |
| 4,169,983 | 10/1979 | Felder | |
| 4,358,693 | 11/1982 | Palmer et al. | 310/46 |
| 4,371,801 | 2/1983 | Richter | |
| 4,382,190 | 5/1983 | Jacobson | |
| 4,392,073 | 7/1983 | Rosenberry, Jr. | 310/216 |
| 4,503,349 | 3/1985 | Miller | |
| 4,521,349 | 6/1985 | Weber et al. | |
| 4,792,237 | 12/1988 | Hara | |
| 4,804,439 | 2/1989 | Fredriksson | |

FOREIGN PATENT DOCUMENTS

| | | | |
|---|---|---|---|
| 2802753 | 7/1979 | Fed. Rep. of Germany | 310/268 |
| 171141 | 7/1988 | Japan | 440/6 |

Primary Examiner—Steven L. Stephan
Assistant Examiner—D. Rebsch
Attorney, Agent, or Firm—David E. Breeden; Stephen D. Hamel; William R. Moser

[57] ABSTRACT

A brushless dc permanent magnet motor drives an autonomous underwater vehicle. In one embodiment, the motor comprises four substantially flat stators in stacked relationship, with pairs of the stators axially spaced, each of the stators comprising a tape-wound stator coil, and first and second substantially flat rotors disposed between the spaced pairs of stators. Each of the rotors includes an annular array of permanent magnets embedded therein. A first shaft is connected to the first rotor and a second, concentric shaft is connected to the second rotor, and a drive unit causes rotation of the two shafts in opposite directions. The second shaft comprises a hollow tube having a central bore in which the first shaft is disposed. Two different sets of bearings support the first and second shafts. In another embodiment, the motor comprises two ironless stators and pairs of rotors mounted on opposite sides of the stators and driven by counterrotating shafts.

5 Claims, 2 Drawing Sheets

DISC ROTORS WITH PERMANENT MAGNETS FOR BRUSHLESS DC MOTOR

LICENSE RIGHTS

The U.S. Government has rights in the invention pursuant to contract No. DE-AC05-84OR21400 between the U.S. Department of Energy and Martin Marietta Energy Systems, Inc.

FIELD OF THE INVENTION

The present invention generally relates to power or drive systems for autonomous underwater vehicles, torpedoes, towed array vehicles and other submersibles and, more particularly, to a high torque counterrotating permanent magnet motor for driving such vehicles.

BACKGROUND OF THE INVENTION

Submersible vehicles require propulsion systems that are efficient and reliable in deep-sea environments. In addition, counterrotating shafts are desirable in some applications. Typically, propeller drive motors are used which provide 20HP at less than 500 rpm. Present day submersibles such as torpedoes and autonomous underwater vehicles (hereinafter also referred to generically as autonomous underwater vehicles) characteristically employ either DC motors, having slip rings and brushes, wherein both the stator and rotor are rotated, or permanent magnet brushless DC motors which do not have counterrotating shafts. Moreover, both motors typically require the use of a gear box. It will be appreciated that conventional DC motors that employ slip rings and/or brushes, suffer a number of disadvantages and problems, including dirt and dust buildup associated with the slip rings, brushes, gearbox speed reducers and the like. Further, the arcing associated with such slip rings and brushes can create a serious hazard in underwater vehicles.

Patents of possible interest in the field of motors include U.S. Pat. Nos. 4,169,983 (Felder); 4,358,693 (Palmer et al); 4,371,801 (Richter); and 4,503,349 (Miller). Briefly considering these references, the Palmer et al patent discloses a permanent magnet motor wherein rotors and stators are alternately disposed along a common shaft on which the rotors are mounted. The Miller patent discloses a pulse generator including a pair of rotors positioned within a stator and mounted for rotation in opposite directions. The Richter patent discloses a permanent magnet motor including alternating rotor and stator disks, the rotors being affixed to a common shaft. The Felder patent discloses a multiple rotor direct current electric motor.

OBJECTS OF THE INVENTION

It is an object of the invention to provide a high torque counterrotating permanent magnet motor for driving autonomous underwater vehicles which provides for the use of counterrotating shafts without the need for slip rings and which eliminates problems associated with conventional DC motors, including those mentioned above such as dirt and dust buildup associated with slip rings, brushes, gearbox speed reducers and the like.

It is a further object of the invention to provide a high torque counterrotating permanent magnet motor for driving autonomous underwater vehicles which reduces conducted, radiated and audible emissions to a minimum.

It is yet another object of the invention to provide a high torque counterrotating permanent magnet motor for driving autonomous underwater vehicles wherein dangerous arcing in the hazardous atmospheres or environments found in such vehicles is eliminated.

SUMMARY OF THE INVENTION

In accordance with one aspect of the invention, a permanent magnet motor is provided for driving an autonomous underwater vehicle, the motor comprising: first, second, third and fourth substantially flat stators disposed in stacked relationship, the first and second stators being axially spaced and the third and fourth stators being axially spaced, and each of the stators comprising a tape-wound stator coil; a first substantially flat rotor disposed between the first and second stators and a second substantially flat rotor disposed between the third and fourth rotors, each of the rotors including at least one permanent magnet embedded therein; and means for providing rotation of the rotors relative to the stators.

In one preferred embodiment, the means for providing rotation of the rotors comprises a single common shaft connected to both of the rotors.

In a further preferred embodiment, means for providing rotation of the rotors comprises a first shaft connected to the first rotor and a second, concentric shaft connected to the second rotor. In this embodiment, there is preferably provided means for causing rotation of the first and second shafts in opposite directions. Advantageously, the second shaft comprises a hollow tube having a central bore therein and the first shaft is disposed within that bore and includes a portion which extends beyond the end of the second shaft that is connected to the second rotor. In a preferred implementation, there is also provided a first set of bearings for supporting the first shaft and a second set of bearings for supporting the second shaft.

In accordance with a further aspect of the invention, a brushless DC permanent magnet motor is provided for driving an autonomous underwater vehicle, the motor comprising: first and second substantially flat, generally cylindrical stators disposed in side by side relation; a first substantially flat, generally cylindrical rotor disposed adjacent to said first stator on one side of the stators and a second substantially flat, generally cylindrical rotor disposed adjacent to the second stator on the other side of the stators, each of the rotors including a plurality of spaced permanent magnets and an iron ring embedded therein for completing the flux path between the magnets; a first shaft connected to the first rotor and a second, concentric shaft connected to the second rotor; and means for providing rotation of the first and second shafts in opposite directions. In an advantageous implementation of this aspect of the invention, the second shaft and the second rotor include central aligned bores therein and the stators include central aligned bores therein, and the first shaft includes a first portion which is received in said bore in the second shaft and a second portion which extends through the bore in the second rotor and through the aligned bores in the stators, and is connected at the distal end thereof to the first rotor.

In accordance with yet another aspect of the invention, a permanent magnet motor is provided for driving an autonomous underwater vehicle, the motor comprising: first, second, third and fourth generally cylindrical, substantially flat stators disposed in stacked relationship, the first and second stators being axially spaced and the third and fourth stators being axially spaced, each of said stators comprising a tape-wound stator coil; a first substantially flat, generally cylindrical rotor disposed between the first and second stators and a second substantially flat, generally cylindrical rotor disposed between the third and fourth rotors, each of the rotors including at least one permanent magnet embedded therein; a first shaft connected to the first rotor and a second, concentric shaft connected to said second rotor; and means for providing rotation of the first and second shafts, and thus of said first and second rotors, in opposite directions.

As in the embodiments above, the second shaft preferably comprises a hollow tube having a central bore therein and the first shaft is disposed within that bore and includes a portion which extends beyond the end of the second shaft that is connected to the second rotor, and there is provided a first set of bearings for supporting the first shaft and a second set of bearings for supporting the second shaft.

In accordance with an additional aspect of the invention, a permanent magnet motor for driving an autonomous underwater vehicle employs an "ironless" stator and, in a preferred embodiment, comprises two such stators and two pairs of sets of rotors, the two rotor sets being driven in opposite directions.

Other features and advantages of the invention will be set forth in, or apparent from, the following detailed description of preferred embodiments of the invention.

DESCRIPTION OF THE PREFERRED EMBODIMENTS

Figure 1:
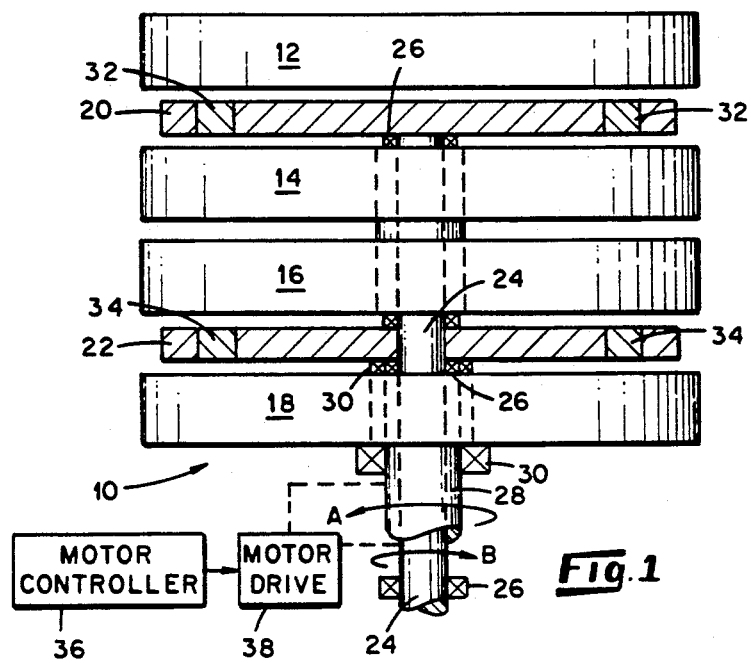
FIG. 1 is a schematic side elevational view, partially in block diagram form, of a low rpm counterrotating permanent magnet motor in accordance with a first embodiment of the invention.

Referring to FIG. 1, a first preferred embodiment of the invention is shown in the form of a high torque, counterrotating permanent magnet motor of the direct drive type (no gearbox). In this embodiment, similarly to the embodiments described below, the motor, which is generally denoted 10, is an axial gap motor of a stacked, pancake-type construction, and, in this particular embodiment, the motor 10 comprises four generally flat cylindrical stators 12 and 14, and 16 and 18 disposed in fixed axially spaced relation and a pair of generally flat cylindrical rotors 20 and 22 disposed between stators 12 and 14 and stators 16 and 18, respectively. In a preferred embodiment, stators 12, 14, 16 and 18 each comprise a tape-wound copper coil, with the tape preferably comprising a silicon steel tape such as "MAGNESIL" tape. Other low core loss magnetic materials can also be used.

Rotor 20 is affixed to a central shaft 24 mounted for rotation in a series of bearings 26 disposed along the length of shaft 24 while rotor 22 is affixed to the free or distal end of a further, outer, hollow shaft 28 mounted for rotation in a further series of bearings 30 disposed along the length of shaft 28. It will be appreciated that shafts 24 and 28 are concentric, with inner shaft 24 being received in the central bore in outer hollow shaft 28 and extending beyond rotor 22 through central openings or bores in stators 14 and 16, while shaft 28 and shaft 24 both extend through a central bore in stator 18. Moreover, as indicated by arrows A and B, shafts 24 and 28 rotate in opposite directions, i.e., are counterrotating.

Rotors 20 and 22 each include respective sets of permanent magnets, denoted 32 and 34, arranged in a ring configuration around the periphery thereof inboard of the peripheral edge, at roughly the same radial distances from the centers of the respective rotors. Magnets 32 and 34 are preferably Nd:Fe:B magnets or other neodymium alloy magnets. The magnets 32 and 34 can also comprise a SmCo, ceramic, Alnico or other material. The magnets 32 and 34 comprise discs of a thickness and diameter determined by the particular application, i.e., vehicle, in which the motor is to be used. The magnets 32 and 34 must provide 2N poles where N is positive number with the magnets being axially magnetized to saturation.

Although shafts 24 and 28 are shown as being counterrotating, it will be understood that the two shafts can also rotate in the same direction and, in the preferred embodiment illustrated in FIG. 1, a motor controller 36 is used to control a motor drive unit 38 so as to control, inter alia, the direction of rotation thereof. Controller 36 and drive unit 38 are of conventional construction.

Testing conducted with respect to the embodiment of FIG. 1 has indicated that the motor depicted therein will operate at approximately 600 rpm at about 100 volts DC and produce a total horsepower of 20 HP.

Figure 2:
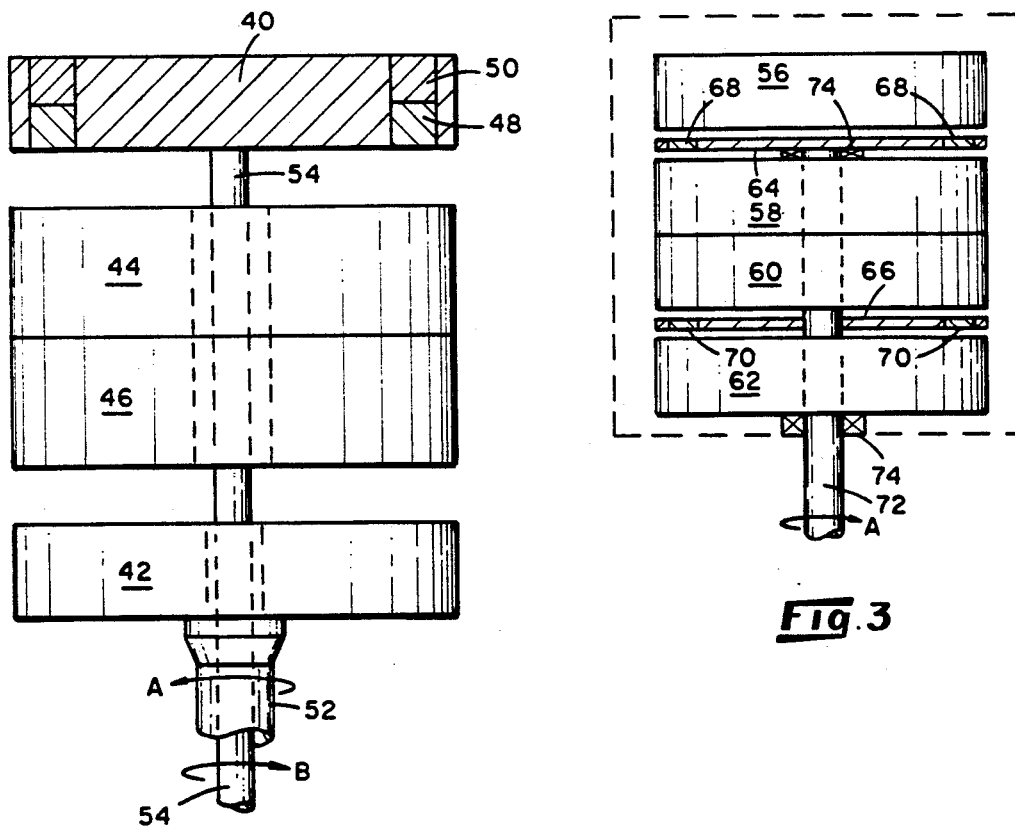
FIG. 2 is a side elevational view of a brushless dc permanent magnet motor in accordance with a second embodiment of the invention.

Referring to FIG. 2, a second embodiment of the invention is shown in the form of a brushless DC permanent motor which includes a pair of rotors 40 and 42 disposed at opposite ends of the motor and a corresponding pair of stators 44 and 46 disposed between rotors 40 and 42. Rotor 40 and 42, which are preferably constructed of aluminum, each include, as shown for a rotor 40, both a ring-shaped or annular arrangement of permanent magnets 48 and a further ring magnet 50, fabricated of black iron, embedded therein. Ring magnet 50 is also magnetized to provide 2N poles. In general, the purpose of ring 50 is to close the magnetic flux path from magnet to magnet for magnets 48. Again, stators 44 and 46 preferably comprise silicon steel tape-wound copper coils while magnets 48 preferably each comprise a permanent Nd:Fe:B magnet but can be made of any of the other materials set forth above. Rotor 42 is affixed to or mounted on the distal end of a first, hollow shaft 52. Rotor 40 is affixed to or mounted on the distal end of a shaft 54 which extends through aligned bores in stators 44 and 46, as well as through a central bore in rotor 42 and in shaft 54, so that, as indicated by arrows A and B, shafts 52 and 54, and thus rotors 40 and 42, can be made to counterrotate.

Testing conducted with respect to the motor depicted in FIG. 2 has indicated that the motor will operate at approximately 630 rpm with a 96 volt battery as the power source and produce a 20 HP maximum power output.

Figure 3:
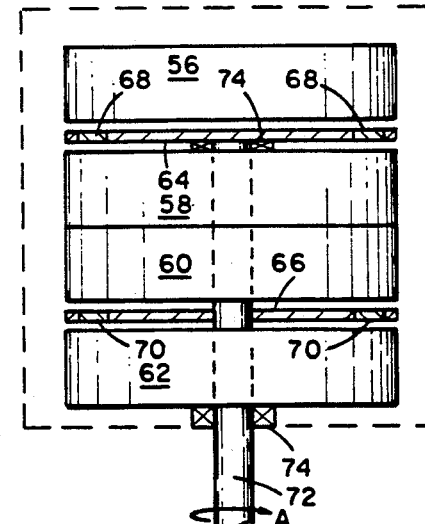
FIG. 3 is a side elevational view of a direct drive motor in accordance with a third embodiment of the invention.

A third embodiment of the invention is shown in FIG. 3. This embodiment is similar to that of FIG. 1 but does not provide counterrotating shafts. In this embodiment, four stacked, axially spaced stators 56, 58, 60 and 62 are provided and rotors 64 and 66 are disposed between stators 56 and 58, and between rotors 64 and 66, respectively. Rotors 64 and 66, which have annular arrays or rings permanent magnets 68 and 70 embedded therein, are mounted on a common shaft 72 as shown. Sets of bearings 74 spaced along the length of shaft 72 permit rotation of shaft 72 as indicated by arrow A.

It is noted that at the highest shaft speeds the above described motors and associated drive systems have been found to be about 95 percent efficient.

Figure 4:
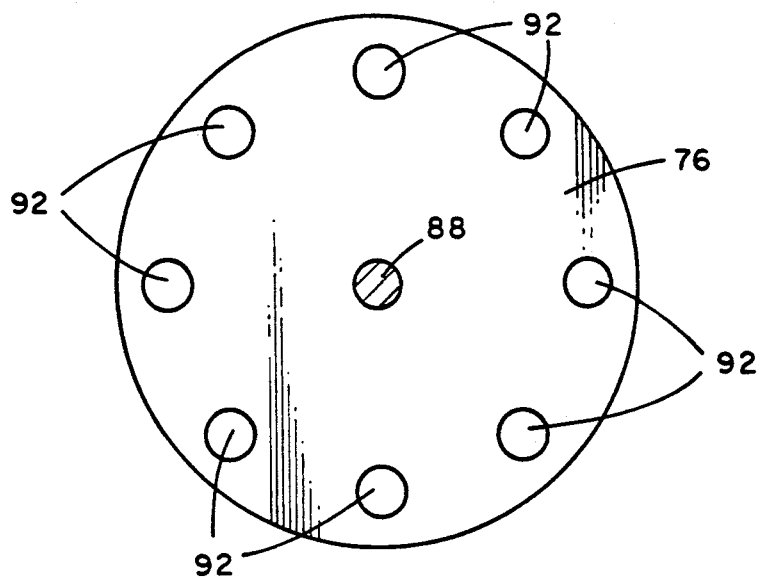
FIGS. 4 and 5 are a cross-sectional view taken in the direction indicated by line 4—4 of FIG. 5 and a side elevational view, respectively, of an "ironless" motor in accordance with a fourth embodiment of the invention.
Figure 5:
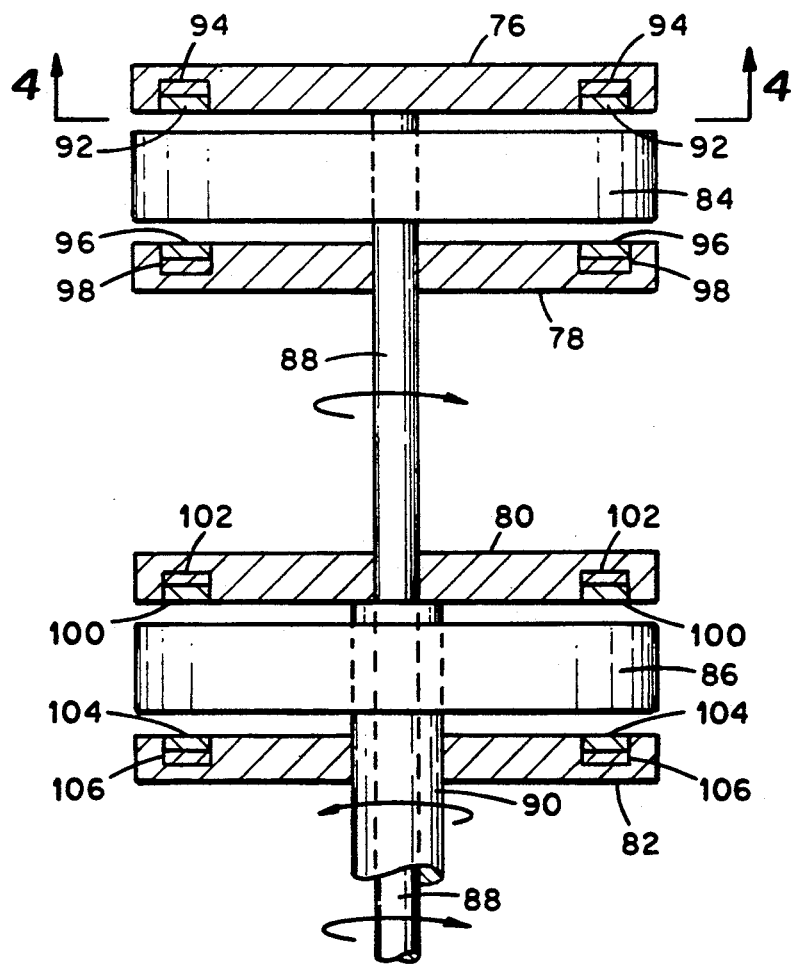

FIGS. 4 and 5 show a further, "ironless" embodiment of the invention. In this embodiment, as shown in FIG. 5, a first pair of spaced rotors 76 and 78 and a second pair of spaced rotors 80 and 82 are provided, with first and second stators 84 and 86 being respectively positioned between the two sets. Rotors 76 and 78 are mounted on a first shaft 88 while rotors 80 and 82 are mounted on a counterrotating shaft 90, in a manner similar to some of the embodiments described above.

As shown in FIG. 4, rotor 76, similarly to the other rotors, comprises a plurality of disc shaped permanent magnets 92 (see also FIG. 5) arranged in a ring or annulus around the periphery thereof. A black iron ring 94 is disposed above (behind) magnets 92 within rotor 76 and, again, acts to close the magnetic flux path between the magnets. Rotor 78 includes a similar array of magnets 96 and an associated iron ring 98, while rotors 80 and 82 incorporate magnets 100 and an iron ring 102, and magnets 104 and an iron ring 106, respectively.

Stators 84 and 86 are so-called ironless stators and preferably comprise copper windings (not shown) in a machineable plastic housing.

It will be appreciated from the foregoing that an axial gap permanent magnet motor constructed in accordance with the invention provides a number of unique advantages and capabilities. For example, the compact construction of the motor enables the motor to meet stringent military weight and volume requirements. Further, the motor incorporates counterrotating shafts but does not require brushes or slip rings. In addition, the motor can be used in high-speed applications, if required. In the latter regard, it is noted that neither brush-type motors nor brushless permanent magnet motors are capable of such high speed operation. Further, the motor of the invention enables stringent "quieting" requirements (which are typical of submersibles such as torpedoes) to be met, something that is not possible with conventional brush-type DC motors. In addition, the dual shaft construction is such that the shafts can readily be switched between rotation in the same direction and rotation in the opposite direction as described above. In fact, this switching can be accomplished by simple changes in the control system logic, not requiring rewiring of the controller.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A brushless dc permanent magnet motor for driving an autonomous underwater vehicle, said motor comprising:

first and second substantially flat, generally cylindrical stators disposed in side by side relation;

a first substantially flat, generally cylindrical rotor disposed adjacent to said first stator on one side of said stators and a second substantially flat, generally cylindrical rotor disposed adjacent to said second stator on the other side of said stators, each of said rotors including, embedded therein, a plurality of permanent magnets arranged in an annular configuration and an iron ring disposed behind the magnets so as to complete a magnetic flux path between the magnets;

a first shaft connected to said first rotor and a second, concentric shaft connected to said second rotor; and means for providing rotation of said first and second shafts in opposite directions;

said second shaft and said second rotor including central aligned bores therein and said stators including central aligned bores therein, and said first shaft includes a first portion which is received in said bore in said second shaft and a second portion which extends through said bore in said second rotor and through said aligned bores in said stators, and is connected at the distal end thereof to said first rotor.

2. A permanent magnet motor for driving an autonomous underwater vehicle, said motor comprising:

first, second, third and fourth generally cylindrical, substantially flat stators disposed in stacked relationship, said first and second stators being axially spaced and the third and fourth stators being axially spaced, each of said stators comprising a tape-wound stator coil;

a first substantially flat, generally cylindrical rotor disposed between said first and second stators and a second substantially flat, generally cylindrical rotor disposed between said third and fourth stators, each of said rotors including, embedded therein, a plurality of permanent magnets arranged in spaced relation in an annular configuration and an iron ring disposed behind the magnets to complete a magnetic flux path between the magnets;

a first shaft connected to said first rotor and a second, concentric shaft connected to said second rotor; and means for providing rotation of said first and second shafts, and thus of said first and second rotors, in opposite directions;

said second shaft comprising a hollow tube having a central bore therein and said first shaft being disposed within said bore and including a portion which extends beyond the end of said second shaft that is connected to said second rotor.

3. A motor as claimed in claim 2 further comprising a first set of bearings for supporting said first shaft and a second set of bearings for supporting said second shaft.

4. A brushless dc permanent magnet motor for driving an autonomous underwater vehicle, said motor comprising:

first and second substantially flat, generally cylindrical, ironless stators;

first and second substantially flat, generally cylindrical rotors disposed on opposite sides of said first stator and third and fourth substantially flat, generally cylindrical rotors disposed on opposite sides of said second stator, each of said rotors including, embedded therein, a plurality of permanent magnets arranged in an annular configuration and an iron ring disposed behind the magnets so as to complete a magnetic flux path between the magnets;

a first shaft connected to said first and second rotors and a second, concentric shaft connected to said third and fourth rotors; and means for providing rotation of said first and second shafts in opposite directions;

said first and second stators, said second shaft and said second, third and fourth rotors including central aligned bores therein, said second shaft extending through said bores in said stator and said fourth rotor to said third rotor and said first shaft extending through said bores in said second shaft, said fourth rotor, said second stator, said third rotor, said second rotor and said first stator to said first rotor.

5. A motor as claimed in claim 4 further comprising a first set of bearings for supporting said first shaft and a second set of bearings for supporting said second shaft.

* * * * *